THIN FILM RESISTOR NETWORK

Filed March 12, 1968

INVENTOR.
BENJAMIN SOLOW
BY Joseph Weingarten
Stanley M. Schurgin
ATTORNEYS

United States Patent Office 3,512,115

Patented May 12, 1970

3,512,115
THIN FILM RESISTOR NETWORK

Benjamin Solow, North Hollywood, Calif., assignor to Angstrohm Precision Incorporated, Van Nuys, Calif., a corporation of Delaware Filed Mar. 12, 1968, Ser. No. 712,437
Int. Cl. H01c 3/00
U.S. Cl. 338—285 11 Claims

ABSTRACT OF THE DISCLOSURE

A thin film resistive ladder network in which each resistor is selectively adjustable without affecting the valve of other resistors in the network. Each resistive path is formed in a respective area of a substrate, the areas being disposed in parallel across the width of the substrate. An individual resistor is trimmed by running a grinding wheel across the area containing that resistor to remove a selected amount of resistive material.

Field of the invention

This invention relates to thin film circuits and more particularly to thin film resistive networks.

Background of the invention

Thin circuits generally comprise an arrangement of planar components formed on a substrate as a configuration of one or more layers of suitable material. For example, a film resistor is typically formed by depositing on a substrate a layer of resistive material in a suitably configured path of a thickness and area to provide the intended resistance value. Interconnection to other components and to circuit terminals on the substrate is accomplished via conductive paths appropriately arranged on the substrate to form the desired connections.

By reason of difficulties in control of the deposition processes used in the fabrication of film circuits, the deposited components are often not of precisely the intended valve, and must be adjusted or "trimmed" to the desired value. Such adjustment is usually accomplished by abrading or otherwise removing selected amounts of the deposited component material to achieve a desired circuit value. It is, in fact, common to form the film components selectively greater or less than the intended value such that the value can be adjusted to that required by removal of a portion of the film thickness. In the case of a film resistor, the resistor is formed having a value less than that required, and, by removing material to reduce the area of the film, the resistance value is increased by the required amount.

A substantial problem exists, however, in adjusting the value of film components which are formed in circuit with other components since adjustment of the value of one component can, by reason of conventional circuit configuration, effect the value of adjacent components in the circuit.

Summary of the invention

In accordance with the present invention, a thin film circuit is provided having a configuration allowing selected adjustment of the several components in the circuit without materially affecting the value of components other than the one being adjusted. As embodied in a resistive ladder network, a plurality of resistive paths are formed on a substrate which has a plurality of areas disposed in parallel along one dimension thereof, each resistive path being non-planar and occupying a respective one of said areas. Each resistive path is arranged in its substrate area such that its surface can be abraded to trim its circuit value without affecting the value of the other resistors in the network.

Description of the drawings

The invention will be more fully understood from the following detailed description, taken in conjunction with the accompanying drawings, wherein.

Detailed description of the invention

Figures 1, 2, 3, 4:
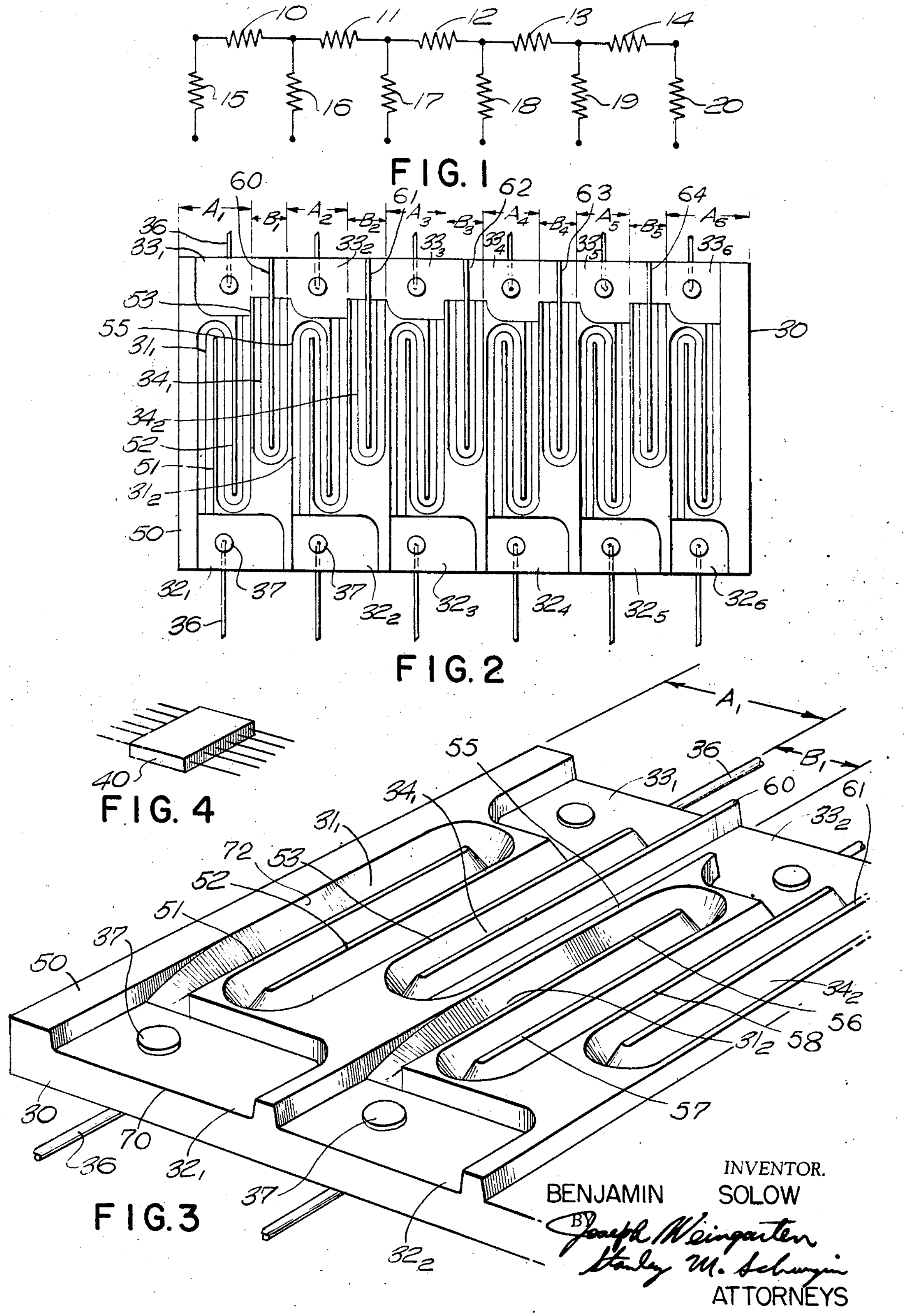
FIG. 1 is a schematic diagram of a resistive ladder network which is formed according to the invention.
FIG. 2 is a greatly enlarged plan view of a thin film ladder network embodying the invention.
FIG. 3 is a greatly enlarged pictorial view, partly broken away, of the network of FIG. 2.
FIG. 4 is a pictorial view of a network according to the invention after encapsulation.

Referring to FIG. 1, there is shown a ladder network including series-connected resistors 10–14, a resistor 15 having one terminal connected to the free end of resistor 10, a resistor 20 having one terminal connected to the free end of resistor 14, and resistor 16–19, each being connected at one end to the respective junctions of resistors 10–14. Networks of more or less than the number of resistors illustrated can, of course, be provided to suit particular operating requirements. In addition, in some instances, it may be desirable to connect the free ends of resistors 15–20 to a common bus line.

Circuits such as the one illustrated in FIG. 1 lend themselves to fabrication in thin film form, a thin film embodiment according to the invention being shown to a greatly enlarged scale in FIGS. 2 and 3. A rectangular substrate 30, typically formed of ceramic or glass, is divided into a plurality of elongated areas designated A1, B1, A2, B2, A3, B3, A4, A5, B5 and A6, which are disposed with their long dimensions across the width of substrate 30 and in parallel array along the length of the substrate. As is evident from FIGS. 2 and 3, a repetitive pattern of grooves and lands exists on the surface of the substrate. The odd numbered areas, namely A1–A6, each have a recurvate groove 31 formed therein between a first recessed portion 32 and a second recessed portion 33. The even numbered areas, B1–B5, each have a U-shaped groove 34 formed therein between adjacent ones of recessed second portions 33. The grooves are preferably of V-shaped cross-section, although they can also be of curved or other cross-section.

Recessed portions 33 extend along one long edge of substrate 30 across adjacent areas A1–A6. As evident from inspection of FIG. 2, the leftmost and rightmost portions, $\mathbf{33_1}$ and $\mathbf{33_6}$, extend across respective areas A1, B1 and B5, A6. Portions of $\mathbf{33_2}$–$\mathbf{33_5}$ extend across three adjacent areas; portion $\mathbf{33_2}$ extends across areas B1, A2, B2; portion $\mathbf{33_3}$ across B2, A3, B3, etc. Adjacent portions $\mathbf{33_1}$–$\mathbf{33_6}$ are separated by respective ridges or lands 60–64. On the opposite edge of the substrate, portion $\mathbf{32_1}$ extends across areas A1, B1; portion $\mathbf{32_2}$ across areas A2, B2, and so forth along the length of the substrate until end portion $\mathbf{32_6}$, which occupies only area A6.

The device is fabricated by well known film deposition techniques. Portions $\mathbf{32_1}$–$\mathbf{32_6}$ and $\mathbf{33_1}$–$\mathbf{33_6}$ are metallized by depositing a conductive film 70 such as gold onto these portions. A suitable resistive material 72 is then deposited in grooves 31 and 34 to form the resistive paths. A portion of the resistive material in each groove is formed over the conductive film in the end portions associated with each groove to provide electrical connections to the resistive paths. Suitable terminals such as lead wires 36 are connected to the conductive film in portions 32 and 33 by means of lead wire heads 37 secured to the conductive film, for example, by conductive cement.

It is apparent from the above description that each resistive path is non-planar with respect to the substrate and can be adjusted in value by selectively removing a portion of the resistive material to decrease its area. The V-shaped groove configuration allows relatively large variations in resistance value to be made by removing relatively small amounts of resistive material. Variations in resistance of 5:1 are easily achieved with resistors constructed according to the invention. Details of the V-shaped groove construction are described in copending application Ser. No. 678,330, filed Oct. 26, 1967, and assigned to the assignee of the present invention.

Each resistive path lies within a respective elongated area. For example, the leftmost path $31_1$ lies in area A1, path $34_1$ in area B1, the next path $31_2$ in area A2, and similarly along the length of the substrate. Each resistive path can, therefore, be adjusted by abrading away or otherwise removing a selected amount of resistive material, such as by running a grinding wheel or ultrasonic grinder across the length of the particular area in which that resistive path is located.

A typical adjustment of the above-described ladder network is accomplished as follows. Lands 50, 51, 52 and 53 are ground down to remove a selected amount of resistive material in the associated grooves to thereby adjust the value of path $31_1$ and partially adjust the value of path $34_1$. Lands 55, 56, 57 and 58 are next ground down to a selected degree to adjust the value of path $31_2$. The values of U-shaped paths $34_1$ and $34_2$ are also altered by this last-mentioned grinding operation since lands 55 and 58 are associated with a portion of these U-shaped paths. The other recurvate paths 31 in the network are similarly adjusted by grinding their associated lands. After all paths 31 have been adjusted to the desired values, the paths 34 are trimmed to the intended values. For example, land or ridge 60 is ground down sufficiently to adjust the value of path $34_1$, while the other paths 34 in the network are similarly trimmed by grinding down the other respective ridges 61–64. Thus, each resistor in the network has been selectively adjusted to an intended value. It will be notad that the U-shaped paths 34 are altered in value during the adjustment of adjacent paths 31; however, the configuration of paths 34 alows their further adjustment by grinding respective ridges 60–64, as described hereinabove. In this manner, the resistive paths 34 can be separately adjusted without affecting the previously adjusted adjacent paths 31.

The particular resistance values of the network are of course chosen to suit the intended circuit operation. For example, if the network were used for analog-digital conversion, resistors 10–14 (paths 34) might be designed to have a resistance value R, while resistors 15–20 (paths 31) might be designed to have a resistance value 2R.

After the desired adjustment of component values, the network can be encapsulated within a protective casing 40 of epoxy, or other suitable material, to provide a relatively rugged and efficient package, as shown in FIG. 4.

The invention is not to be limited by what has been particularly shown and described, except as indicated in the appended claims.

What is claimed is:

1. A resistive network comprising:
an insulative substrate having a plurality of parallel areas arranged along the length thereof, said plurality being equal to the number of resistors in said network;
first and second conductive terminal portions disposed on respective opposite ends of each of said areas, each of said first conductive terminal portions being electrically separate and distinct from the other first conductive terminal portions, and each second conductive terminal portion being electrically separate and distinct from the other second conductive terminal portions;
a first non-planar resistive path formed on first alternate ones of said areas between and in contact with said first and second terminal portions; and
a second non-planar resistive path formed on second alternate ones of said areas between and in contact with adjacent ones of said first terminal portions.

2. A resistive network comprising:
an insulative substrate having a plurality of parallel areas arranged along the length thereof, said plurality being equal to the number of resistors in said network;
first and second conductive terminal portions disposed on respective opposite ends of each of said areas;
a first sinuous groove formed in first alternate ones of said areas between said first and second terminal portions;
a second sinuous groove formed in second alternate ones of said areas between adjacent ones of said first terminal portions; and
a film of resistive material formed in each of said grooves and in contact with the terminal portions associated with said grooves.

3. The resistive network according to claim 2 wherein said second sinuous groove is U-shaped.

4. The resistance network according to claim 2 wherein said terminal portions are recessed and lie within the plane of said grooves.

5. The resistive network according to claim 2 wherein each terminal portion has a lead wire connected thereto and secured to said substrate.

6. The resistive network according to claim 2 further including a protective casing surrounding said substrate.

7. The resistive network according to claim 2 wherein said grooves are of V-shaped cross-section and said resistive film is formed on the walls of said grooves.

8. A resistive network comprising:
a planar substrate formed of a ceramic material and having a plurality of parallel areas arranged along the length thereof, said plurality of areas being equal to the number of resistors in said network;
first and second recessed terminal portions disposed on respective opposite ends of each of said areas;
a film of conductive material formed in each of said recessed terminal portions;
a repetitive pattern of grooves and lands formed on a surface of said substrate, said pattern including:
a plurality of first sinuous grooves formed in said substrate, each lying in respective first alternate ones of said areas and extending between the first and second terminal portions associated with the area in which said groove is formed;
a film of resistive material formed in each of said first grooves thereby providing a plurality of first resistive paths each electrically connected between first and second conductive terminal portions associated with the area in which said groove is formed;
a plurality of second sinuous grooves formed in said substrate, each lying in respective second alternate ones of said areas and extending between adjacent ones of said first terminal portions;
a film of resistive material formed in each of said second grooves thereby providing a plurality of second resistive paths each electrically connected between respective adjacent ones of said first conductive terminal portions; and
a plurality of lead wires, each electrically connected to respective ones of said conductive terminal portions.

9. The resistive network according to claim 8 wherein each of said ressitive paths is selectively adjustable by abrading the surface thereof.

10. The resistive network according to claim 8 wherein the resistance values of each of said resistive paths is selectively adjustable by grinding down the lands of the grooves containing the path being adjusted.

11. The resistive network according to claim 10 wherein the resistance value of each of said second resistive paths is adjustable without affecting the resistance value of adjacent first resistive paths.

References Cited

UNITED STATES PATENTS

| | | | |
|---|---|---|---|
| 2,629,166 | 2/1953 | Marsten | 338—325 X |
| 2,775,673 | 12/1956 | Johnson | 338—285 |
| 2,994,848 | 8/1961 | Rayburn | 338—325 |
| 3,353,136 | 11/1967 | Umantsev | 338—325 X |

FOREIGN PATENTS

| | | |
|---|---|---|
| 150,922 | 5/1937 | Austria. |

ELLIOT A. GOLDBERG, Primary Examiner

U.S. Cl. X.R.

338—195, 289, 311, 320, 325